Figure 1:
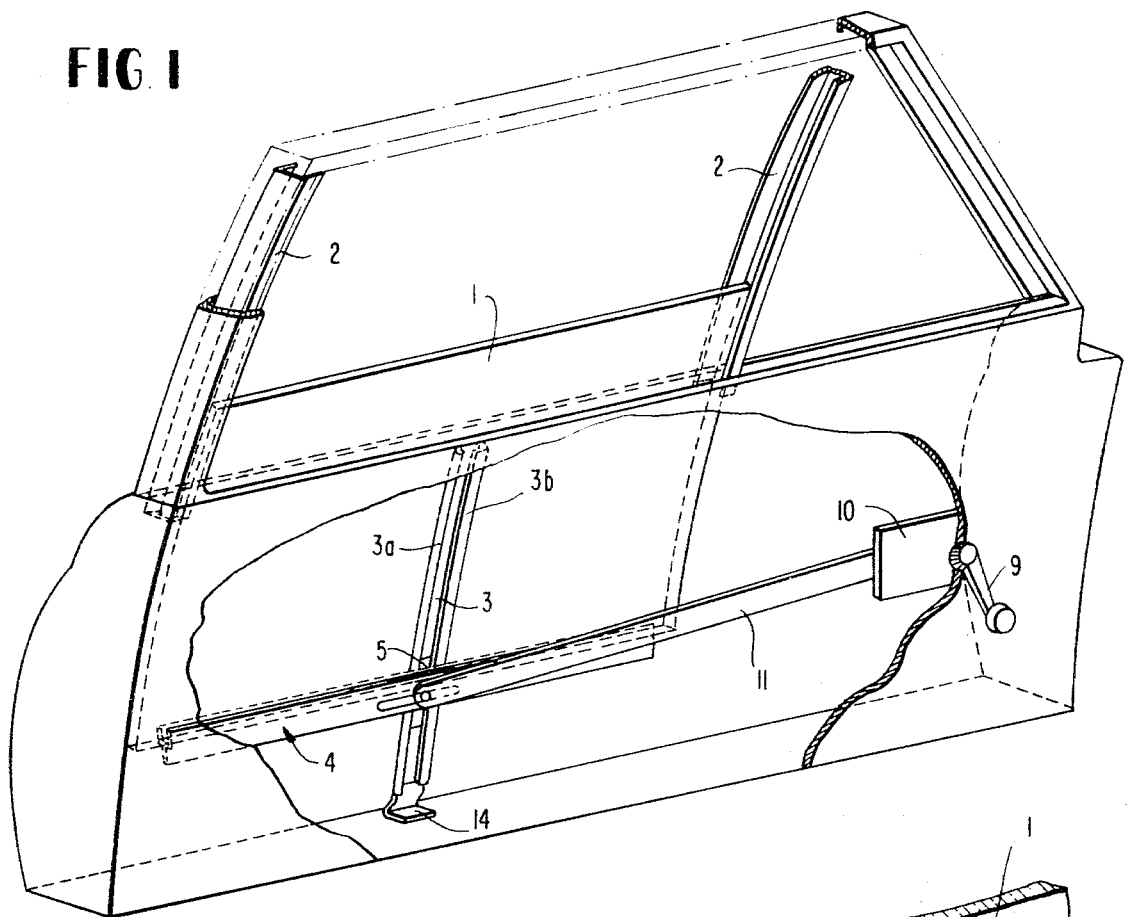

United States Patent [19]
Breitschwerdt et al.

[11] 3,754,353
[45] Aug. 28, 1973

[54] WINDOW LIFTER, ESPECIALLY FOR CURVED SIDE WINDOWS OF MOTOR VEHICLES

[75] Inventors: Werner Breitschwerdt, Stuttgart-Botnang; Günter Gmeiner; Erwin Kölle, both of Sindelfingen (Wurtt.); Herbert Bönisch, Darmsheim (Wurtt.), all of Germany

[73] Assignee: Daimler-Benz Aktiengesellschaft, Stuttgart-Unterturkheim, Germany

[22] Filed: Sept. 16, 1970

[21] Appl. No.: 72,760

[30] Foreign Application Priority Data
Sept. 19, 1969 Germany.................. P 19 47 386.0

[52] U.S. Cl.......................... 49/227, 49/350, 49/375
[51] Int. Cl.............................................. E05f 11/52
[58] Field of Search........................ 49/41, 350, 351, 49/375, 227, 372, 374, 353, 348, 349, 373, 376, 408; 296/154

[56] References Cited
UNITED STATES PATENTS

| 974,863 | 11/1910 | Dilley | 49/408 X |
|---|---|---|---|
| 1,708,616 | 4/1929 | Grimm | 49/350 X |
| 2,051,422 | 8/1936 | Rissmann | 160/28 X |
| 2,638,833 | 5/1953 | Snyder | 296/154 X |
| 3,219,335 | 11/1965 | Burridge | 49/375 X |
| 3,288,677 | 1/1966 | Martens | 49/41 |
| 3,247,616 | 4/1966 | Peras | 49/227 X |
| 2,015,448 | 9/1935 | Esser | 49/408 X |
| 2,145,659 | 1/1939 | Lane | 49/350 X |
| 2,207,891 | 7/1940 | Mackey | 49/227 |
| 3,062,528 | 11/1962 | Martens | 49/227 |
| 3,413,760 | 12/1968 | Gorys et al. | 49/227 X |
| 3,398,488 | 8/1968 | Garvey | 49/227 X |

FOREIGN PATENTS OR APPLICATIONS

| 637,547 | 5/1950 | Great Britain | 49/373 |
|---|---|---|---|
| 1,137,140 | 1/1957 | France | 49/375 |

*Primary Examiner*—Dennis L. Taylor
*Attorney*—Craig, Antonelli, Stewart & Hill

[57] ABSTRACT

A window lifter, particularly for curved side windows of motor vehicles, in which the window panes are displaceable in lateral guide rails that extend essentially only over the height of the window opening and in which an upright column is arranged on the inside of the window compartment, that is matched to the curvature of the window pane; a guide part is securely connected with the bottom edge of the window pane to permit adjustment of the window in its height by means of the guide column; the guide column itself is constructed as a sectional member open on one side in which a sliding body is guided that is securely connected to the guide part of the pane.

19 Claims, 3 Drawing Figures

Patented Aug. 28, 1973 3,754,353

INVENTORS:
WERNER BREITSCHWERDT
GÜNTER GMEINER
ERWIN KÖLLE
HERBERT BÖNISCH

BY Craig, Antonelli,
Stewart & Hill
ATTORNEYS

WINDOW LIFTER, ESPECIALLY FOR CURVED SIDE WINDOWS OF MOTOR VEHICLES

The present invention relates to a window lifter, especially for curved side windows of motor vehicles in which the window panes are displaceable in lateral guide rails which extend essentially only over the height of the window opening, and in which an upright column adapted essentially to the curvature of the window pane is arranged on the inside of the window shaft or compartment, by means of which a guide part rigidly connected with the bottom edge of the window pane is guided so as to be displaceable in its height position, as described in the copending application Ser. No. 840,295, assigned to the assignee of the instant application, the contents of which are incorporated herein by reference to the extent necessary.

A window guidance and adjusting installation for curved or arcuately shaped windows is provided by the construction according to the aforementioned copending application, which assures an easy manipulation and handling under all driving conditions since the friction forces for the actuation of the window adjustment are only slight. It has now been discovered that a further advantageous construction of the subject matter of the aforementioned copending application can be attained if the guide column is constructed as a profile or sectional member open on one side only, in which is guided a corresponding slide body rigidly connected with the guide part of the window pane. This type of construction, in addition to a more light-weight construction, by means of which weight is economized, entails above all a more simple and less costly construction of the slide body which can also be mounted and assembled considerably more easily than the guide part of the aforementioned copending application.

Appropriately a U-shaped profile or sectional member constructed with inwardly directed leg portions may be provided as profile part, in which a T-shaped slide body is guided whose web portion corresponding to the cross leg of the T is secured at the guide part of the window pane by way of a sheet-metal connecting plate. A completely satisfactory and unobjectionable guidance without large expenditures can be realized thereby which is not subjected to the danger of a canting or edging. The slide body may be constructed thereby in a simple manner from an angularly bent sheet metal strip and may be surrounded by a velour material at the web portion corresponding to the cross leg of the "T." In this manner, a good seating of the sliding body in the guide rail is achieved without having to overcome excessively large frictional forces during the window adjustment. Of course, also a corresponding part made from any conventional synthetic resinous material may be provided as sliding body.

The sheet-metal connecting member between the sliding body and the guide part of the pane may be constructed in a particularly advantageous manner as a protective sheet metal member or plate extending uninterruptedly over the entire width of the pane and inclined toward the door outer body panel, which serves the purpose of conducting away from the interior of the door the water dropping down along the window pane. As a result of the construction according to the present invention, all parts and aggregates disposed within the door, i.e., also the height adjusting aggregates for the window pane, are protected in case of rain against the running-down water, which can again escape in the usual manner into the atmosphere at the bottom of the door.

Accordingly, it is an object of the present invention to provide a window lifter, particularly for curved side windows of motor vehicles, which avoids by simple means the aforementioned shortcomings and drawbacks encountered in the prior art.

Another object of the present invention resides in a window lifter, particularly for curved side windows of motor vehicles which distinguishes itself by light weight and small costs.

A further object of the present invention resides in a window lifter of the type described above, which permits more easy manufacture and assembly of the parts thereof while assuring at the same time a completely satisfactory guidance without excessive expenditures.

A still further object of the present invention resides in a window lifter for curved side windows of motor vehicles which minimizes the danger of canting and dispenses with the need to overcome large frictional forces during adjustments of the window.

Another object of the present invention resides in a window lifter of the type described above, which effectively protects all parts on the inside of the vehicle door against rain water running down along the window.

Figure 2:
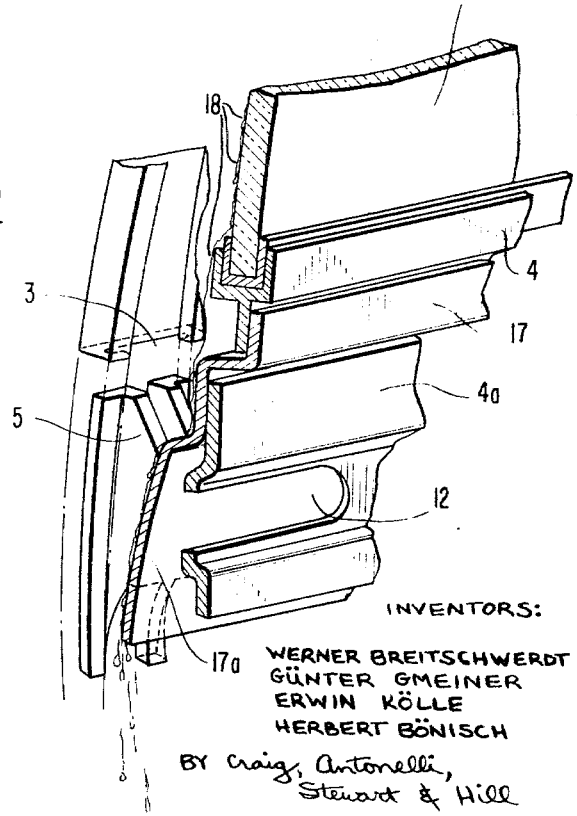
Figure 3:
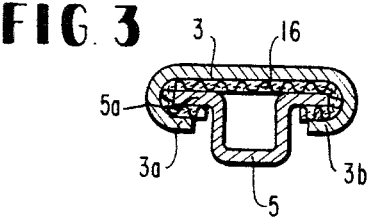

These and further objects, features and advantages of the present invention will become more obvious from the following description when taken in connection with the accompanying drawing which shows, for purposes of illustration only, one embodiment in accordance with the present invention, and wherein:

FIG. 1 is a somewhat schematic perspective view of the inside of a side door constructed in accordance with the present invention, whereby a part of the inner door cover is broken away;

FIG. 2 is a partial perspective view, on an enlarged scale, illustrating the sliding body in the guide rail and its manner of fastening at the guide part of the window pane, with certain parts shown in cross section for the sake of clarity, and FIG. 3 is a cross-sectional view perpendicular to the direction of movement through the profile guide rail with the sliding body guided therein in accordance with the present invention.

Referring now to the drawing wherein like reference numerals are used to designate like parts throughout the various views, a guide column 3 is secured by way of a flange 14 in the window shaft or compartment of a motor vehicle side door in a manner similar to the aforementioned copending application. A sliding body 5 which is guided in the column 3, is rigidly connected with a guide part generally designated by reference numeral 4 for the curved side window pane 1. The side window pane 1 is guided at the window frame in lateral guide rails 2. The lateral guide rails 2 extend only over the height of the window opening and are adapted to the curvature of the side window pane 1. The sliding body 5 together with the guide part 4 and the side window pane 1 arranged thereat may be adjusted in the height thereof by way of a lever 11, a gear crank drive 10 of conventional construction and a hand crank 9.

As can be seen in particular from FIGS. 2 and 3, the guide column 3 is constructed as profile or section member open on one side whose leg portions 3a and 3b (FIG. 3) point inwardly so that a guide rail results on the inside thereof, in which the T-shaped slide body 5 is guided with its part 5a corresponding to the cross leg of the T. The part 5a of the sliding body 5 is surrounded in the illustrated embodiment according to FIG. 3 with a velour material 16 that enables an easy sliding within the U-shaped profile.

The guide part 4 of the side window 1 is rigidly connected with the slide body 5 as can be seen in particular from FIG. 2, by way of the connecting sheet-metal member or plate 17 which is connected with the slide body 5 either by a threaded connection or by welding at the area 17a thereof inclined toward the door outside. Additionally, the part 4a provided with the guide slot 12 is also rigidly connected with the sheet-metal connecting member 17; the lever 11 permits to lift the window pane 1 by way of the part 4a. The inclined sheet metal part 17a is now constructed according to the present invention in such a manner that it extends over the entire width of the side window pane 1. Since it is inclined toward the outer surface of the door, it acts in this type of construction, in addition to acting as securing member, also as a protective plate for the water 18 dropping down from the window pane 1 which water runs along the part 17a and thus does not come into contact with the parts disposed on the inside of the door, for example, with the lever 11 and with the guide slot 12. Also the door lock and other parts can thus be protected from the direct contact with the running-off water which is discharged in a conventional manner at the bottom of the door.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A window lifter for a door in which a window pane is displaceable in lateral guide rail means, extending approximately only over the height of a window opening, and in which an upright guide column means is arranged on the inside of a window shaft, at least one guide part securely connected with the bottom edge of the window pane being guided by said guide column means so as to be displaceable in its height position, characterized in that the guide column means is constructed as profile member open on one side, in that a corresponding sliding body rigidly connected with the guide part of the window pane is guided in said profile member, and in that the connecting means between the sliding body and the guide part is constructed as a protective plate extending uninterruptedly substantially over the entire width of the window pane and inclined outwardly in the downward direction toward the outer cover of the door for conducting away any water, dripping down from the pane, from the interior of the door.

2. A window lifter according to claim 1, characterized in that the window pane is curved and the guide column means is matched essentially to the curvature of the window pane.

3. A window lifter according to claim 1, characterized in that the profile member is constructed as approximately U-shaped profile with inwardly directed leg portions, in which is guided an approximately T-shaped sliding body whose web portion corresponding to the cross leg of the T is secured at the guide part of the window pane by way of a connecting means.

4. A window lifter according to claim 3, characterized in that the sliding body is formed from an angularly shaped sheet metal strip.

5. A window lifter according to claim 4, characterized in that the web portion of the sliding body corresponding to the cross leg of the T is surrounded by a low friction fabric material.

6. A window lifter according to claim 5, characterized in that said fabric is velour material.

7. A window lifter according to claim 1, characterized in that the connecting means is a sheet-metal connecting plate.

8. A window lifter according to claim 7, characterized in that the window pane is a curved side window for a motor vehicle.

9. A window lifter according to claim 7, characterized in that the window pane is curved and the guide column means is matched essentially to the curvature of the window pane.

10. A window lifter arrangement for a window pane comprising: outer body panel means, inner body panel means spaced from said outer panel means to form a window shaft therebetween, a window opening formed in said inner and outer panel means above said window shaft, an upright guide column means arranged in said window shaft, said guide column means being constructed as a profile member open on one side, at least one guide part securely connected with the bottom edge of the window pane, a sliding body extending into the open side of said guide column means for sliding movement within said guide column means, connecting means for rigidly connecting said sliding body with said guide part, and moving means for imparting movement to said guide part, wherein said connecting means is constructed as a water shed means for conducting water from the guide part outwardly and downwardly toward said outer panel means, and wherein said connecting means is constructed as a protective plate extending uninterruptedly substantially over the entire width of the window pane, whereby portions of the moving means are protected from rainwater and the like impinging on the window pane and dripping onto the guide part for all moved positions of the window pane.

11. An arrangement according to claim 10, wherein said connecting means is a sheet metal connecting plate, the upper end of said plate being sealingly fixed at the guide part, the lower end of said plate being fixed to said sliding body, said lower end being disposed outwardly with respect to said upper end such that water flowing downwardly over said plate is conducted outwardly.

12. An arrangement according to claim 10, wherein said guide part is constructed with a U-shaped upwardly facing channel for holding the window pane and with a downwardly extending flange, said connecting means being attached to said flange.

13. An arrangement according to claim 12, wherein said connecting means is a sheet metal connecting plate, the upper end of said plate being sealingly fixed at the guide part, the lower end of said plate being fixed to said sliding body, said lower end being disposed outwardly with respect to said upper end such that water flowing downwardly over said plate is conducted outwardly.

14. An arrangement according to claim 10, wherein said connecting means is disposed between the outer panel means and the operative connection of said guide part to said moving means.

15. An arrangement according to claim 14, wherein said connecting means is a sheet metal connecting plate, the upper end of said plate being sealingly fixed at the guide part, the lower end of said plate being fixed to said sliding body, said lower end being disposed outwardly with respect to said upper end such that water flowing downwardly over said plate is conducted outwardly.

16. An arrangement according to claim 10, further comprising lateral guide rail means at each side of the window opening for aiding in the guiding of the window pane.

17. An arrangement according to claim 10, wherein the window pane is curved and the guide column means is matched essentially to the curvature of the window pane.

18. An arrangement according to claim 10, wherein the profile member is constructed as approximately U-shaped profile with inwardly directed leg portions, in which is guided an approximately T-shaped sliding body whose web portion corresponding to the cross leg of the T is secured at the guide part of the window pane by way of the connecting means.

19. An arrangement according to claim 10, wherein the window pane is a curved side window for a motor vehicle.

* * * * *